United States Patent Office 3,454,012
Patented July 8, 1969

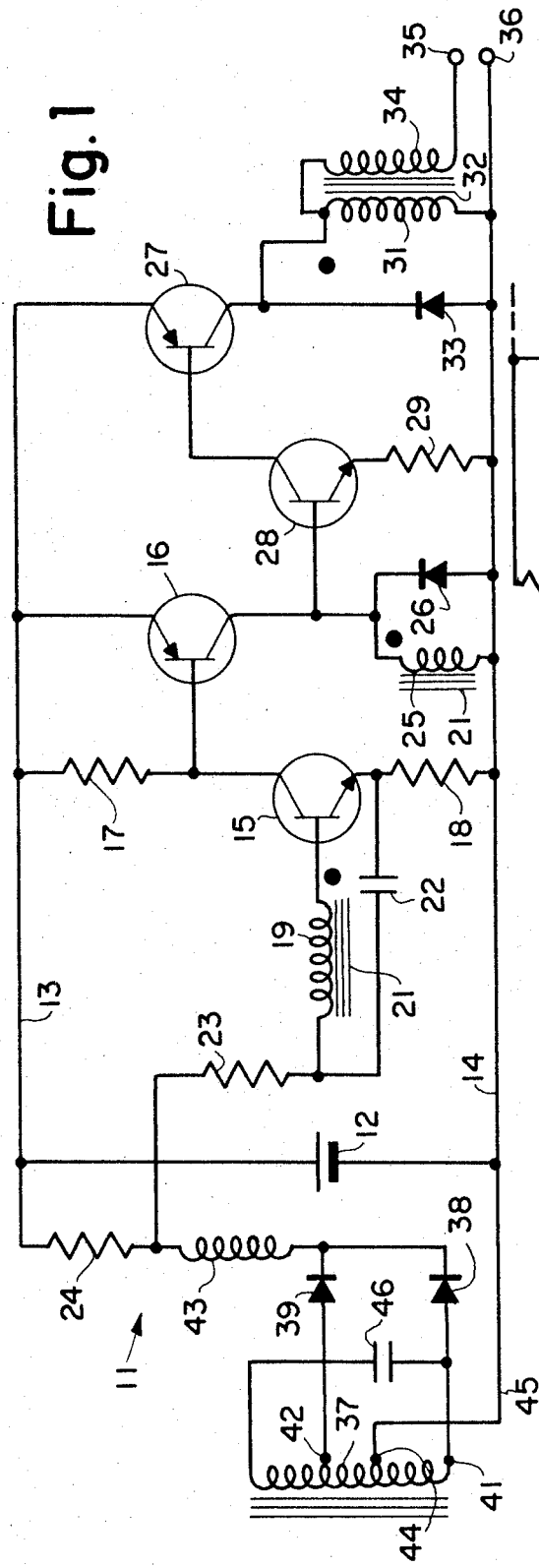
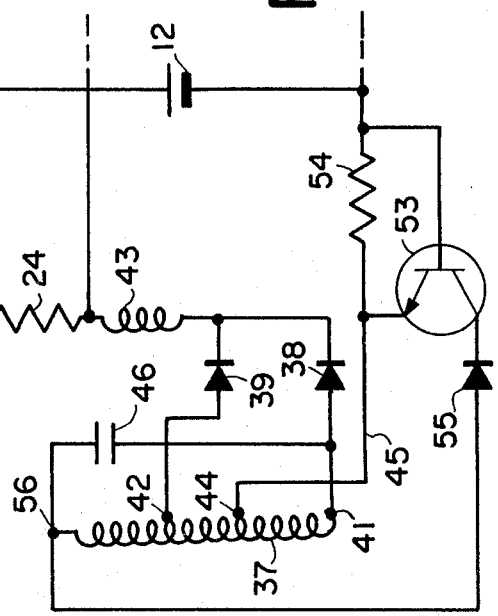
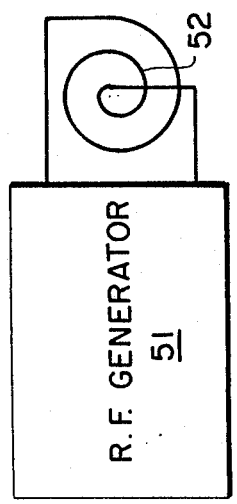

3,454,012
RECHARGEABLE HEART STIMULATOR
William J. Raddi, Philadelphia, Pa., assignor, by mesne assignments, to ESB Incorporated, Philadelphia, Pa., a corporation of Delaware
Filed Nov. 17, 1966, Ser. No. 595,084
Int. Cl. H03k *3/30;* H02j *7/00;* H01m *45/04*
U.S. Cl. 128—422                                        7 Claims

ABSTRACT OF THE DISCLOSURE

An electronic heart stimulator of the type adapted to be implanted in the human body, wherein the heart stimulator is powered by a rechargeable battery the recharging of which is accomplished by energy transmitted at radio frequencies which is inductively coupled to a receiver in the stimulator. A transistorized two-stage rate adjustable blocking oscillator is disclosed which produces voltage pulses which are fed through an output stage by means of a driver stage. A radio frequency receiving coil and rectifying means attached thereto are provided for battery recharging.

---

The use of implantable heart stimulators in the treatment of heart block has been developed and increased substantially with the last decade. Several disadvantages, however, are inherent among most conventional units. For example, prior art heart stimulators are powered by primary batteries which require periodic replacement by means of surgery. While the frequency of battery replacement can be reduced by the use of larger batteries, the relatively large dimension of such batteries require that they be located subcutaneously in the abdomen. This can cause discomfort and a conspicuous bulge at the patient's waistline. Still further, the electrical connections from these stimulators to the myocardium are provided by a pair of specially constructed wire leads. These leads although extremely flexible have demonstrated frequent breakage as a result of the constant motion of the body and the heart.

It is a specific object of the invention to overcome all of the forementioned shortcomings with the use of a single secondary cell as the entire energy source. With a small rechargeable single cell battery to replace the bulky primary multicell battery, size and weight are substantially reduced. This substantial reduction in volume and mass enables the attachment of the entire stimulator either directly to the heart or nearer thereto thus either eliminating the necessity for leads or greatly reducing their length.

Another object of the present invention is to provide a rechargeable heart stimulator with a rate sensitive recharging network that increases the pulse rate proportionally to the charging current. This allows the charged current to be accurately set without physical contact with the heart stimulator.

A further object of this invention is to provide a rechargeable battery powered heart stimulator with a charge current limiting circuit to insure safer battery recharging.

A still further object of the present invention is to provide a heart stimulator with a pulse rate substantially independent of battery voltage.

The foregoing objects of the present invention are accomplished in a transistorized heart stimulator adapted to be energized by a rechargeable single cell battery. The heart stimulator comprises a two-stage rate adjustable blocking oscillator designed to produce pulses of fixed duration. These pulses are fed by means of a driver stage to an output stage and further stepped up by a transformer to produce output voltage pulses which can be applied to the heart. The circuit is specifically designed to have a pulse rate substantially independent of battery voltage. The heart stimulator also includes a tuned radio frequency receiver adapted to receive and rectify radio frequency energy to recharge the battery. Transmission of battery recharging energy is accomplished by a transmitting antenna which may be worn by the patient for a specific period of time at set recharging intervals. When a battery charging current is flowing, the heart stimulator is further designed to produce an increased pulse rate which is proportional to the charging current. This allows the battery charging current to be accurately monitored and/or controlled.

A better understanding of the present invention may be had from the following description which when read with reference to the accompanying drawings of which:

FIG. 1 is a circuit diagram of an embodiment of the present invention;

FIG. 2 is a schematic diagram of a battery charging transmitter circuit; and

FIG. 3 is a circuit diagram of a modification of the embodiment of the present invention as shown in FIG. 1.

Referring now to FIG. 1, the numeral 11 generally designates a heart stimulator of the present invention which is adapted to provide electrical pulses of predetermined duration and rate for application to the human heart. The heart stimulator 11 is powered by a rechargeable battery 12 which is connected between the conductors 13 and 14. The battery 12 may be of the nickel-cadmium type which has an output voltage of approximately 1.25 volts and is available in a flat round container 15/16 inch in diameter and 3/8 inch thick. The heart stimulator 11 utilizes a pair of transistors 15 and 16 connected as a rate adjustable blocking oscillator. The transistor 15 is of the NPN type and the transistor 16 is of the PN type. Both transistors have the usual emitter, collector and base electrodes. The collector of the transistor 15 is connected to the conductor 13 by means of a resistor 17 and the emitter of the transistor 15 is connected to the conductor 14 by means of a resistor 18. The base of the transistor 15 is connected through the secondary winding 19 of the transformer 21 to the junction of a capacitor 22 and a resistor 23. The capacitor 22 is connected to the emitter of the transistor 15 and the resistor 23 is connected to the conductor 13 through a resistor 24. The base of the transistor 16 is directly coupled to the collector of the transistor 15. The emitter of the transistor 16 is connected to the conductor 13 and the collector of the transistor 16 is connected to the conductor 14 through the primary winding 25 of the transformer 21 and a diode 26 which is connected in parallel with the primary winding 25. The transformer 21 provides regenerative feedback between the output of the transistor 16 and the input of the transistor 15.

The output of the blocking oscillator is coupled to an output transistor 27 by means of a driver stage employing a transistor 28. The transistors 27 and 28 are of the PNP and NPN types respectively and have the usual emitter, collector and base electrodes. The base of the transistor 28 is directly coupled to the collector of the transistor 16. The emitter of the transistor 28 is connected to the conductor 14 by means of the resistor 29 and the collector of the transistor 28 is directly coupled to the base of the transistor 27. The emitter of the transistor 27 is connected to the conductor 13 and the collector of the transistor 27 is connected to the conductor 14 through the primary winding 31 of an output transformer 32 and the diode 33 connected in parallel therewith. The output transformer 32 has a secondary winding 34 which is connected in series with the primary winding 31 to effect an autotransformer configuration which switches the battery voltage in series with the induced voltage. The output terminals of the stimulator are the secondary winding terminal 35 and the terminal 36 which is connected to the negative terminal of the battery by the conductor 14.

The battery 12 is adapted to be recharged by means of a current resulting from a voltage induced in a receiving coil 37. The receiving coil 37 is preferably a ferrite core receiving coil. This current is rectified by means of a pair of diodes 38 and 39 connected to the coil 37 at an end terminal 41 and a tap 42. The diodes 38 and 39 are connected together and to the positive terminal of the battery 12 through an inductance 43 and the resistor 24. As shown, the negative terminal of the battery 12 is connected to a tap 44 on the coil 37 by means of a conductor 45. The coil 37 is tuned to a suitable radio frequency by means of a capacitor 46 connected across its end terminals.

Referring now to FIG. 2, there is shown a schematic diagram of a recharging transmitter for the heart stimulator of FIG. 1. As shown, the transmitter is composed of a radio frequency generator or tunable oscillator 51 and a transmitting antenna 52. The transmitting antenna may be several turns of wire wound at a suitable radius which may be between 2 to 5 inches. The plane transmitting antenna coil 52 is designed to be held perpendicular to the axis of the receiving coil 37 to establish good transmission. If the oscillator 51 is properly tuned to the receiving coil 37, reception of 50 milliwatts at a distance of over 2 inches can be achieved. The transmitting antenna 52 may be mounted on a belt which may be strapped across the patient's body adjacent to the receiver. The patient would be required to wear the belt or other device containing the antenna 52 for a period of approximately 2 to 10 hours at suitable intervals to recharge the battery 12 depending on the interval of recharging.

In considering the operation of the heart stimulator 11, the transistors 15 and 16 are connected as a two-stage rate adjustable blocking oscillator which produces pulses of fixed duration. When a positive voltage is applied to the base of the transistor 15, the collector of that transistor goes more negative causing the transistor 16 to conduct and current to flow through the primary winding 25 of the transformer 21. Current flowing in the primary winding 25 of the transformer 21 induces a voltage in the secondary winding 19 of the transformer 21 causing the base of the transistor 15 to become more positive. This regenerative action causes a rapid pulse rise which continues until terminated by the saturation of the transistors 15 and 16. With saturation the voltage across the primary winding 19 disappears and the base of the transistor 15 is made negative with respect to the emitter by the charge on the capacitor 22. This turns off the transistor 15. The transistor 15 stays non-conductive until the capacitor 22 is discharged through the resistor 23 and again assumes a positive charge with respect to the base of the transistor 15. The width of the pulse thus produced is controlled primarily by the inductance of the transformer 21 and the capacitor 22.

The pulses produced by the oscillator are applied to the input of the transistor 27 by the transistor 28 which is connected as a driver stage. The output transformer 32 in the output circuit of the transistor 27 steps up these pulses and the voltage appearing across the output terminals 35 and 36 is the amplified pulse voltage plus the battery voltage. The pulse rate of the heart stimulator 11 is relatively independent of the battery voltage, since the capacitor 22 discharges through the resistor 23 more rapidly at higher battery voltages, however, since a higher voltage is also developed across the capacitor 22 by a higher battery voltage switch on the primary winding 25 of the transformer 21 the effects are off-setting.

During battery recharging, a voltage is induced in the receiving coil 37 causing a current to flow through the inductance 43 and the resistor 24 in such a direction that the resistor 23 is more positive than the positive terminal of the battery 12. This increases the pulse frequency of the oscillator because it increases the discharge rate of the capacitor 22. In this manner, the pulse rate of the heart stimulator is made to increase proportionally with the recharging current. For example, circuit components can be selected so that the pulse rate of the heart stimulator 11 is made to increase three beats per minute for each 5 milliamperes of charging current. This feature allows the recharging current to be accurately set or controlled without physical contact with the stimulator.

Referring now to FIG. 3, there is shown a modification of the embodiment of the present invention shown in FIG. 1 which is designed to provide charging current limitation. Similar reference characters have been utilized to designate components similar to those shown in FIG. 1. Charging current limitation is obtained by means of a transistor 53 which is connected as a shunt across the receiving coil 37. The transistor 53 is an NPN transistor having the usual emitter, collector and base electrodes. The emitter and base circuit of the transistor 53 is connected in shunt across a resistor 54 connected in series in the conductor 45. The collector of the transistor 53 is connected in series with a diode 55 to the end terminal 56 of the receiving coil 37.

In operation, a charging current flowing from the tap 44 on the receiving coil 37 through the conductor 45 to the battery 12 causes a voltage drop across the resistor 54. This voltage drop controls the conductivity of the transistor 53, the emitter-collector circuit of which is connected as a shunt across the receiving coil 37. In this manner the charging current flowing to the battery 12 can be limited to a value which will permit a safe battery charging rate to be maintained regardless of the amount of energy transmitted to the receiving coil 37.

By way of illustration, typical values of the circuit components of a heart stimulator as shown in the drawings may be as follows:

| Resistors: | Ohms |
|---|---|
| 17 | 47K |
| 18 | 470 |
| 23 | 400K |
| 24 | 10 |
| 29 | 100 |
| 54 | 33 |

| Transistors: | |
|---|---|
| 15 | 2N718a |
| 16 | 2N711b |
| 27 | 2N797 |
| 28 | 2N985 |
| 53 | 2N718a |

| Capacitors: | |
|---|---|
| 22 | µf 1.5 |
| 46 | µµf 560 |

| Diodes: | (Transitron) |
|---|---|
| 26 | SG5000 |
| 33 | SG5000 |
| 39 | SG5000 |
| 38 | SG5000 |
| 55 | SG5000 |

| Inductances: | Mh. |
|---|---|
| 37 | 200 |
| 43 | 100 |

| Transformers: | Inpedance ratio ohms |
|---|---|
| 21 | 250/600 |
| 32 | 50/1000 |

When connected as shown in FIGS. 1 and 3 these components deliver 70, 4 volt pulses of 0.75 millisecond duration per minute to a 500 ohm load. The recharging current limit is set at 20 milliamperes.

In considering the present invention it can be seen that there has been provided a heart stimulator incorporating many features which, whether taken singularly or in combination, constitute improvements in the art. For example, the utilization of a sealed rechargeable battery as the energy source for the heart stimulator eliminates the need for frequent surgery to replace the primary battery previously used. A small button type nickel-cadmium battery with 225 milliampere hours capacity can be employed as the source of energy for the heart stimulator. Such batteries have life spans 10 years or more in this type of service. The specific circuit features disclosed and claimed permit the use of such a rechargeable battery with a maximum degree of safety. By the utilization of a rate adjustable oscillator as a fundamental pulse source, accurate monitoring of the charging current can be achieved without physical contact with the heart pacer or the battery. In addition, where desired, circuitry can be included such as that described in connection with FIG. 3 which will automatically limit the charging current.

The transistorized heart stimulator of the present invention is smaller and lighter than heart stimulators heretofore available. A heart stimulator having the components described in connection with FIG. 1 can be assembled into a package only 1⅝ inches wide, 1⅜ inches high and ½ inch thick when potted in a medically suitable potting compound. Such a unit weighs only 45 grams. This unit is small enough to be mounted in close proximity to the heart for use as direct cardiac implant or sufficiently close to permit the use of a short transvenous catheter or shortened leads of the conventional type. This reduced size is made possible by circuitry adapted to be energized from a single cell rechargeable battery.

Having described this invention, that which is claimed as new is:

1. A heart stimulator adapted to be implanted in the human body comprising, in combination, an oscillator adapted to produce pulses at an adjustable rate for application to the heart, output terminals connected to said stimulator and connectible to the heart for applying said pulses thereto, a rechargeable battery for energizing said oscillator and battery recharging means connected to said oscillator and to said battery comprising energy receiving means and rectifying means connected between said receiving means and said battery to convert energy transmitted to said receiving means to a current for recharging said battery, and circuit means responsive to the flow of said recharging current to said battery and changing the pulse rate of said oscillator in proportion to said recharging current.

2. A heart stimulator adapted to be implanted in the human body comprising, in combination, a transistorized circuit comprising a blocking oscillator, driver stage and output stage, a rechargeable battery connected to said circuit to energize the same, an output transformer in said output stage of said circuit having a pair of output terminals adapted for connection to the heart, a radio frequency receiving coil, rectifying means connected between said coil and said battery adapted to rectify radio frequency energy transmitted to said coil into a battery recharging current, circuit means connected between said rectifying means and said blocking oscillator to adjust the output rate of said oscillator in proportion to said battery charging current.

3. A heart stimulator adapted to be implanted in the human body comprising, in combination, a blocking oscillator for generating pulses for application to the body, said oscillator having a capacitor in the input thereto the charge on which controls the rate of pulse generation, a rechargeable battery connected for energizing said oscillator, radio frequency receiving means, rectifying means connected between said receiving means and said battery to convert radio frequency energy transmitted to said receiving means to a current for recharging said battery, circuit means connecting said capacitor to said rectifying means to cause and flow of a recharging current to said battery to change the pulse generation rate of said oscillator in proportion to the magnitude of said battery charging current, and output terminals adapted to be connected to the heart to apply said pulses thereto.

4. Apparatus as specified in claim 3 where in charging current limiting means are connected between said rectifying means and said battery.

5. A transistorized heart stimulator adapted to be implanted in the human body comprising, in combination, a blocking oscillator for generating pulses, a driver stage, and output stage, said output stage having output terminals adapted to be connected to the heart, said output stage connected to said oscillator by means of said driver stage to amplify and apply the pulses produced by said oscillator to the heart by means of said terminals, said oscillator having a capacitor in the input thereto discharge rate thereof controlling the rate of pulse generation, a rechargeable battery connected for energizing said oscillator, energy receiving means, rectifying means connected between said receiving means and said battery to convert energy transmitted to said receiving means to a recharging current for said battery, and circuit means connecting said capacitor to said rectifying means to cause the flow of a recharging current to said battery to change the pulse generation rate of said oscillator in proportion to the magnitude of said battery charging current.

6. Apparatus as specified in claim 5 wherein said output stage includes an autotransformer connected in series with said battery whereby the battery voltage is added to the output pulses.

7. Apparatus as specified in claim 6 wherein charging current limiting means are connected between said rectifier means and said battery.

References Cited

UNITED STATES PATENTS

| | | | |
|---|---|---|---|
| 3,109,430 | 11/1963 | Tischler | 128—422 |
| 3,195,540 | 7/1965 | Waller | 128—422 |
| 3,281,639 | 10/1966 | Potter et al. | 320—43 |
| 3,311,111 | 3/1967 | Bowers | 128—422 |

WILLIAM E. KAMM, *Primary Examiner.*

U.S. Cl. X.R.

320—9, 39; 331—112